(12) United States Patent
Saito

(10) Patent No.: US 6,373,373 B1
(45) Date of Patent: Apr. 16, 2002

(54) ELECTRONIC PRESSURE-SENSITIVE DEVICE FOR DETECTING THE MAGNITUDE OF LOAD AS ELECTRICAL RESISTANCE

(75) Inventor: Mitsuru Saito, Miyagi-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 09/729,450

(22) Filed: Dec. 4, 2000

(30) Foreign Application Priority Data

Dec. 6, 1999 (JP) ............................................ 11-346095

(51) Int. Cl.$^7$ ............................................... H01C 10/10
(52) U.S. Cl. ........................ 338/47; 338/99; 338/101; 357/26
(58) Field of Search ........................... 338/47, 99, 101, 338/113, 114; 357/26

(56) References Cited

U.S. PATENT DOCUMENTS 4,494,105 A * 1/1985 House ......................... 338/114
4,856,993 A * 8/1989 Maness et al. ................ 433/68
5,563,354 A * 10/1996 Kropp ..................... 73/862.473
5,948,990 A   9/1999 Hashida \* cited by examiner

*Primary Examiner*—Lincoln Donovan
*Assistant Examiner*—Kyung S. Lee
(74) *Attorney, Agent, or Firm*—Brinks Hofer Gilson & Lione

(57) ABSTRACT

Disclosed is an electronic pressure-sensitive device which has a long service life and which is capable of detecting with high accuracy loads of various magnitudes including values in proximity to zero. In the electronic pressure-sensitive device, first and second resistive element layers 2b and 6b are formed on the outermost surfaces of first and second contact portions 2 and 6, and the first and second resistive element layers 2b and 6b are constantly maintained in an electrical contact state, the force bringing the first and second resistive element layers 2b and 6b into press contact with each other being detected as the electrical resistance between the first and second contact portions 2 and 6.

11 Claims, 5 Drawing Sheets

ELECTRONIC PRESSURE-SENSITIVE DEVICE FOR DETECTING THE MAGNITUDE OF LOAD AS ELECTRICAL RESISTANCE

BACKGROUND OF THE INVENTION

1. Field of the Invention

The present invention relates to an electronic pressure-sensitive device for detecting the magnitude of a load as electrical resistance and, in particular, to an electronic pressure-sensitive device capable of detecting the magnitude of a load ranging from a small load to a large load.

2. Description of the Related Art

For example, as shown in FIG. 7, in a conventional electronic pressure-sensitive device used in a seat sensor or the like detecting whether a person is sitting on a seat, a first contact portion 52 formed on a flexible first insulating substrate 51 and consisting of a conductive material is opposed to a second contact portion 56 formed on a flexible second insulating substrate 55 and consisting of a conductive material through the intermediation a gap, the width of the gap being maintained by a spacer 54 provided between the first and second insulating substrates.

When a load is applied to the first and second insulating substrates 51 and 55, the insulating substrates 51 and 55 are deflected toward the gap. And, the load applied to the first and second insulating substrates 51 and 55 exceeds a threshold value, the first contact portion 52 is brought into contact with the second contact portion 56, and the electronic pressure-sensitive device is turned ON.

In the conventional seat sensor, a plurality of electronic pressure sensitive devices as described above are arranged in the plane of a seat base (the seat base receiving the weight of a person), and, from the in-plane distribution of the electronic pressure-sensitive device which has been turned ON, it is detected whether a person is sitting on the seat or not. And, when the presence of a person sitting on the seat is detected, an air bag is operated when the vehicle undergoes a collision.

However, in the conventional electronic pressure-sensitive device, which is turned ON when a load of a magnitude not less than a threshold value is applied, it is difficult to detect a small load applied to the electronic pressure-sensitive device or variation in the load.

Further, since the first and second insulating substrates 51 and 55 are deflected toward the gap, the burden applied to the first and second insulating substrates 51 and 55 is large, and, when the first and second insulating substrates 51 and 55 are deformed so as to protrude toward the gap, the threshold value varies to thereby cause malfunction.

In a motor-vehicle-mounted seat sensor using this conventional electronic pressure-sensitive device, it is difficult to detect the magnitude of a load, so that it is impossible to sense the physique of the person sitting on the seat, to operate the air bag in conformity with the physique of the person sitting on the seat, some other device is necessary. Further, in the case of a motor-vehicle-mounted sensor, a load can be continuously applied at high temperature, so that it is necessary to use an expensive material such as polyethylene terephthalate, which has a superior heat resistance, for the first and second insulating substrates 51 and 55, which are continuously deflected by the load (baggage), resulting in a high cost.

SUMMARY OF THE INVENTION

Accordingly, it is an object of the present invention to provide an electronic pressure-sensitive device which has a long service life and which is capable of detecting loads of various magnitudes including a minute load in appropriate resistance values.

In accordance with the present invention, there is provided an electronic pressure-sensitive device comprising a first substrate consisting of an insulating material, a first contact portion formed on the first substrate, a first resistive element provided on the surface of the first contact portion, a second substrate consisting of an insulating material and opposed to the first substrate, a second contact portion formed on the second substrate and opposed to the first substrate, a high resistance material, a second resistive element constituting the first contact portion and provided on the surface of the second contact portion, and an adhesive member provided between the first and second substrates and adapted to glue the first and second substrates to each other, wherein the first and second resistive elements are constantly in an electrical contact state, and wherein a press contact force acting between the first and second resistive elements is detected as the electrical resistance between the first and second contact portions by pressurizing the first and second contact portions from at least one side.

In this electronic pressure-sensitive device, the first and second resistive elements consisting of a high resistance material are constantly in an electrical contact state, so that, even when no load is applied to the substrates, the electrical resistance measured between the first and second contact portions is a limited value. When a load is applied to at least one of the first and second substrates, even if it is a minute load, the pressure contact force which acts between the first and second resistive elements according to the load increases, and the electrical contact area of the first and second resistive elements increases, whereby the contact resistance decreases, so that the electrical resistance measured between the first and second contact portions is a value according to the load. Thus, due to the electrical resistance measured between the first and second contact portions, it is possible to detect loads of various magnitudes including those in the proximity of zero.

Further, since there is no need to maintain a gap between the contact portions, there is no need to provide a maintaining member for maintaining a gap, and there is no deterioration in performance due to deformation of the maintaining member. Further, since there is no gap between the contact portions, the amount of deformation (deflection amount) due to the load is small, so that there is little burden on the substrates, thereby providing a long service life.

Further, even when the magnitudes of the press contact forces acting on the first and second resistive elements are the same, the higher the specific resistance of the first and second resistive element materials, the higher the electrical resistance measured between the first and second contact portions, so that, by varying the specific resistance of the first and second resistive element materials according to the magnitude of the load detected by the electronic pressure-sensitive device (the specifications of the electronic pressure-sensitive device), the electrical resistance measured between the first and second contact portions is an appropriate value, making it possible to detect the load according to the specifications in an appropriate electrical resistance.

Further, by gluing together the first and second substrates by an adhesive member, the first and second resistive elements are secured at predetermined positions, and the opposition area of the first and second resistive elements is maintained constant, so that it is possible to reduce the factor leading variation in the detection of the load.

Further, in the electronic pressure-sensitive device of the present invention, the adhesive member is formed at a position deviated from the first and second resistive elements in such a way as to surround the first and second resistive elements.

In this electronic pressure-sensitive device, the adhesive member surrounds the first and second resistive elements with the first and second substrates to make it possible to reduce the influence from the external environment. Further, the electrical contact of the first and second resistive elements is not hindered by the adhesive member.

Further, in the electronic pressure-sensitive device of the present invention, at least one of the first and second substrates is flexible, and the adhesive member consists of a sheet-like member, the gap between the first and second substrates being larger at the positions where the first and second contact portions are formed than at the position where the adhesive member is provided.

In this electronic pressure-sensitive device, the substrates are deflected between the adhesive member and the contact portions, so that the first and second contact portions are pressurized from the side of the deflected substrates, whereby a press contact force acts on the first and second resistive elements, making it possible to constantly keep the first and second resistive elements in an electrical contact state without imparting any external force.

Further, when the sum total of the thicknesses of the first and second contact portions is the same and no external force (load) is applied, the press contact force (referred to as pressurization) acting on the first and second contact portions (resistive elements) due to the deflected substrates is larger when the adhesive member is thin than when it is thick.

Thus, even when the magnitude of the load applied to the substrates is the same, the electrical resistance between the first and second contact portions is lower when the adhesive member is thin than when it is thick. However, when the load applied to the substrates is sufficiently large, and the press contact force (pressurization) due to the deflection of the substrates is negligible, the electrical resistance between the first and second contact portions converges on a value which does not depend on the thickness of the adhesive member. Thus, the variation in the electrical resistance between the contact portions with respect to the variation in the load applied to the substrates is milder when the adhesive member is thin.

Utilizing the above load/electrical-resistance characteristics, the thickness of the adhesive member is varied according to the width between the minimum value and the maximum value of the load detected by the electronic pressure-sensitive device (the specifications of the electronic pressure sensitive device), whereby adjustment can be conducted from the electrical resistance corresponding to the minimum load to the electrical resistance corresponding to the maximum load, so that it is possible to detect a load within a desired detection range in an appropriate electrical resistance.

Further, in the electronic pressure-sensitive device of the present invention, both the first and second substrates are flexible, so that it has a superior shock resistance and the substrates are not damaged by the load or the like.

Further, in the electronic pressure-sensitive device of the present invention, an opening is provided in the adhesive member consisting of a sheet-like member, and the first and second resistive elements are brought into an electrical contact state inside this opening, and the sum total of the thicknesses of the first and second contact portions is larger than the distance between the first and second substrates at the position where the adhesive member is provided.

Thus, it is possible to bring the first and second resistive elements exposed through the opening due to the thicknesses of the first and second contact portions and the thickness of the sheet-like member even in the case in which no external force is applied.

Further, in the electronic pressure-sensitive device of the present invention, the adhesive member is formed such that adhesive layers are formed on both sides of the sheet-like member, so that there is little variation in the thickness of the adhesive member, and it is possible to produce the device such that the distance between the first and second substrates is constant.

Further, in the electronic pressure-sensitive device of the present invention, at least one of the first and second contact portions has a conductor consisting of a conductive material electrically connected to the first and second resistive elements.

In this electronic pressure-sensitive device, it is possible to effect electrical connection between the first and second resistive elements and the exterior through the conductor, so that it is possible to effect more reliably an electrical connection between the first and second resistive elements and the exterior.

Further, in the electronic pressure-sensitive device of the present invention, the first and second contact portions have the first and second conductors, respectively, and the first and second conductors are opposed to each other through the first and second resistive elements, and formed in the entire area where the first and second resistive elements are opposed to each other.

In this electronic pressure-sensitive device, the current path between the first and second conductors is substantially perpendicular to the opposing surfaces of the first and second resistive elements, and is the shortest path in the first and second resistive elements, so that, on either side of the electrical contact surfaces of the first and second resistive elements, the electrical resistance of the current path can be made low. Thus, the electrical resistance output between the first and second contact portions can be such that the component due to the contact resistance is predominant.

Further, in substantially the entire area of the opposing surfaces of the first and second resistive elements, current paths are distributed, so that in the resistant output, the variation in the electrical characteristics in the first and second resistive element surfaces is averaged, giving a stable output.

Further, in the electronic pressure-sensitive device of the present invention, the first and second resistive elements are respectively formed on the surfaces of the first and second conductors, and the surface area of the resistive elements is different from the surface area of the conductors.

In this electronic pressure-sensitive device, the surface area of the conductors and that of the resistive elements are different, so that in the process for superimposing the resistive elements on the conductors, misregistration in formation between them (e.g., misregisration in printing) can be absorbed due to the difference in magnitude as compared with the case in which the surface area of the conductors and that of the resistive elements are the same, so that it is easy to make the overlapping area of the resistive elements and the conductors, making it possible restrain variation in characteristics.

Further, in the electronic pressure-sensitive device of the present invention, the resistive elements cover the entire surface of the conductors.

In this electronic pressure-sensitive device, the conductors are not exposed to the exterior, so that it is possible to prevent short-circuiting between the conductors and the other contact portions. Further, since the conductors are cut off from the external environment, it is possible to prevent a deterioration in the conductors.

Further, in the electronic pressure-sensitive device of the present invention, the first and second resistive elements are formed of the same material, so that it is possible to reduce the number of kinds of resistive element material, whereby it is easy to control the materials and it is possible to prevent generation of improper use.

Further, in the electronic pressure-sensitive device of the present invention, the first and second resistive elements are formed of a material whose specific resistance ranges from $10^2$ to $10^6$ ($\Omega \cdot$cm), so that the resistance value measured between the first and second contact portions is an appropriate value, making it possible to correctly detect the load.

To perform the detection more accurately, it is desirable that the specific resistance of the material range from $10^3$ to $10^5$ ($\Omega \cdot$cm).

Further, in the electronic pressure-sensitive device of the present invention, a wiring pattern consisting of a conductive material is formed on at least one of the first and second substrates, and the wiring pattern is electrically connected to the first and second resistive elements.

In this electronic pressure-sensitive device, power supply from the outside to the contact portions and the resistance value output between the first and second contact points (power output in accordance with the resistance value) are effected by using the wiring pattern, so that there is no need to separately connect a lead wire or the like to the resistive elements, so that the construction is simple, and it is possible to make the electrical connection between the contact portions and the exterior more reliable.

DESCRIPTION OF THE PREFERRED EMBODIMENTS

The electronic pressure-sensitive device of the present invention will be described with reference to FIGS. 1 through 5.

Figure 1:
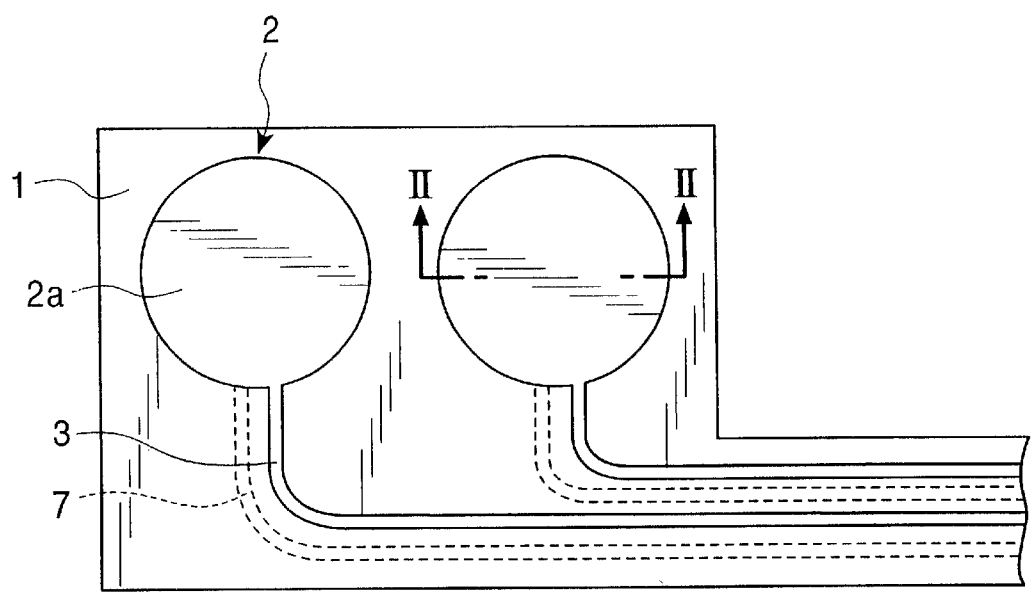
FIG. 1 is a plan view illustrating an electronic pressure-sensitive device according to a first embodiment of the present invention.
Figure 2:
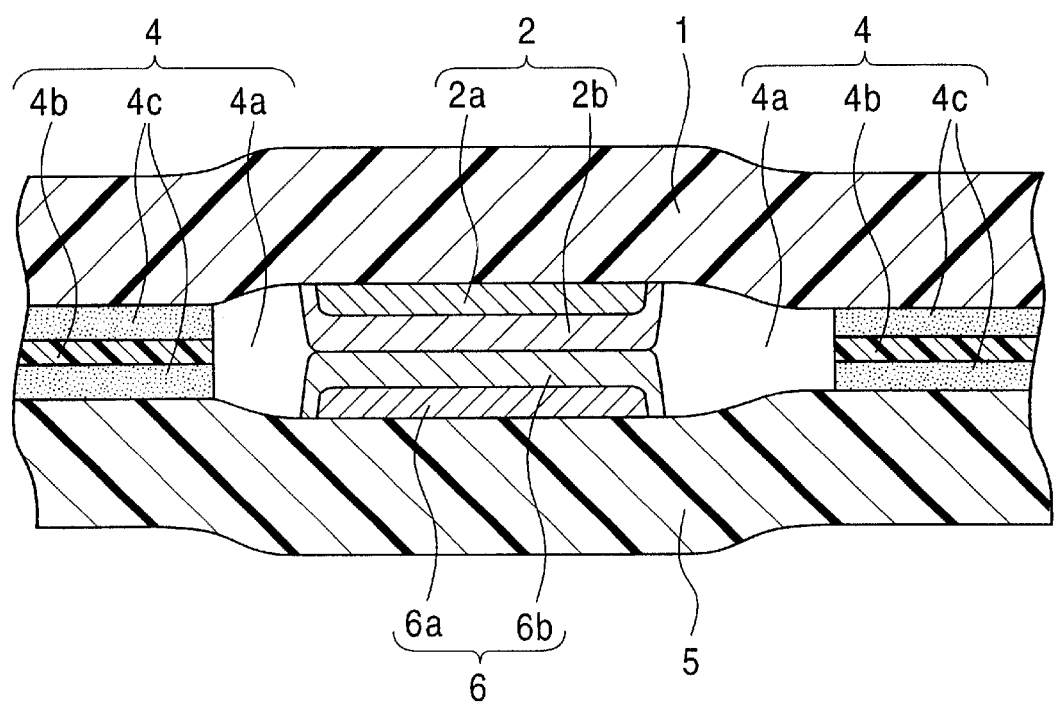
FIG. 2 is a sectional view taken along the line II—II of FIG. 1.

First, the construction of the first embodiment of the present invention will be described. FIGS. 1 and 2 are a plan view and a sectional view of the first embodiment. The member formed on the first substrate is indicated by a solid line, and the member formed on the second substrate is indicated by a dashed line.

The first substrate 1 consists of a flexible flat polyester substrate having a thickness of 50 to 150 $\mu$m, and, on the first substrate 1, there is formed a first circular contact portion 2 having a diameter of 10 to 20 mm. The first contact portion 2 has a double-layer structure in which a first conductor 2a in the form of a layer (hereinafter referred to as the first conductor layer 2a) and a first resistive element 2b in the form of a layer (hereinafter referred to as the first resistive element layer 2b) are sequentially stacked together, and the circular first conductor layer 2a having a thickness of 10 $\mu$m consists of a conductive material in which silver particles as a conductive filler are dispersed in a binder resin such as polyester, polyurethane or acrylic resin.

The first resistive element layer 2b consists of a high-resistance material whose specific resistance is approximately $10^4$ ($\Omega \cdot$cm). It is formed, for example, by dispersing metal oxide particles such as titan oxide or zinc oxide or carbon particles such as carbon black or graphite in a thermosetting resin such as phenol as a binder resin.

The first resistive element layer 2b is thick enough (25 $\mu$m) to prevent generation of pin holes, and covers the surface of the first conductor layer 2a to constitute the outermost surface layer of the first contact portion 2, and the first conductor layer 2a is formed substantially in the entire area within the plane of the first resistive element layer 2b.

A first wiring pattern 3 formed on the same surface on which the conductor layer 2a of the first substrate 1 is formed consists of the same material as the first conductor layer 2a, and is integrally formed with the first conductor layer 2a.

An adhesive member 4 consists of a base member 4b consisting of a polyester film and having a thickness of 5 $\mu$m and adhesive layers 4c formed on both sides of the base member 4b and having a thickness of 12 $\mu$m. The entire thickness of the adhesive member is smaller than double the thickness of the first contact portion 2. Further, there is provided at a predetermined position a substantially circular opening (hereinafter referred to as a through-hole 4a) having a diameter of 11 to 22 mm, the diameter of the through-hole 4a being larger than that of the first contact portion 2.

The second substrate 5 and the second contact portion 6 formed on the second substrate 5 are of the same material, configuration and construction as the first substrate 1 and the first contact portion 2, the second contact portion 6 consisting of a second conductor 6a in the form of a layer (hereinafter referred to as the second conductor layer 6a) and a second resistive element 6b in the form of a layer (hereinafter referred to as the second resistive element layer 6b).

A second wiring pattern 7 formed on the same surface on which the second conductor layer 6a of the second substrate 5 is provided is formed of the same material as the first wiring pattern 3, and is integrally formed with the second conductor layer 6a.

The adhesive member 4 exists between the first and second substrates 1 and 5 to glue together the first and second substrates 1 and 5 and serves to maintain a gap between the first and second substrates 1 and 5.

Inside the through-hole 4a of the adhesive member 4, the first contact portion 2 is superimposed on the second contact portion 6 so as to be matched therewith, and is secured in position with the second contact portion 6. At this time, the first resistive element layer 2b is in contact with the second resistive element layer 6b in the entire mutual area. Further, the first and second contact portions 2 and 6 are surrounded by the adhesive member 4 and the first and second substrates 1 and 5.

Further, the sum total of the thicknesses of the first and second contact portions 2 and 6 is larger than the thickness of the adhesive member 4, so that the flat first and second substrates 1 and 5 are deflected between the adhesive member 4 and the first and second contact portions 2 and 6. In the first and second substrates 1 and 5, there is generated due to the deflection a force pressurizing the first and second contact portions 2 and 6, so that a press contact force (referred to as pressurization) acts on the first and second resistive element layers 2b and 6b.

The first and second wiring patterns 3 and 7 are electrically connected through the first and second contact portions 2 and 6, and connected to the exterior to effect power supply to the first and second contact portions 2 and 6 and output of the resistance value between the first and second contact portions 2 and 6.

Figure 3:
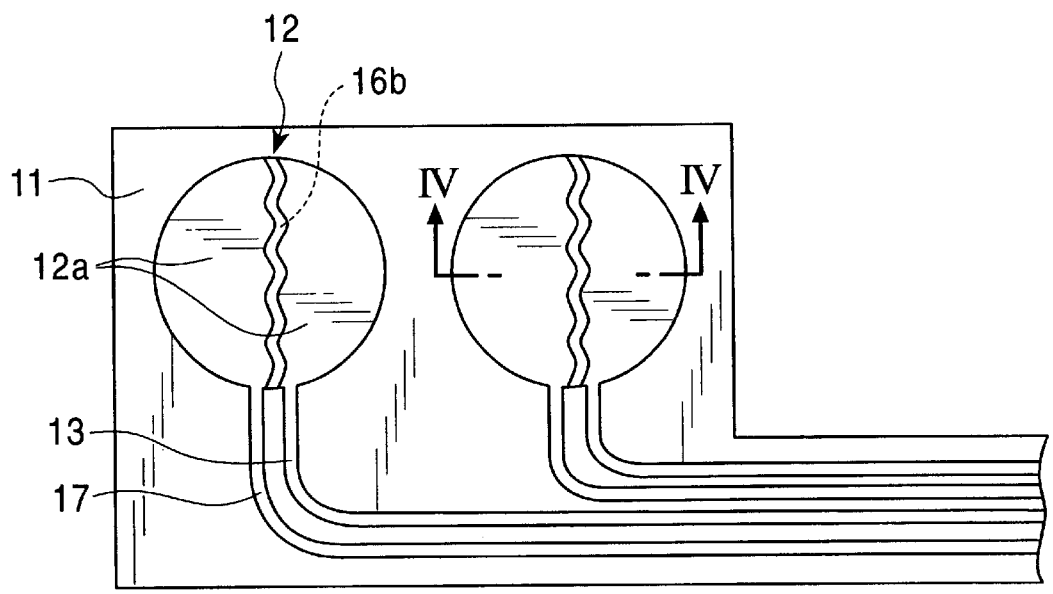
FIG. 3 is a plan view illustrating an electronic pressure-sensitive device according to a second embodiment of the present invention.

Next, the construction of the second embodiment of the present invention will be illustrated with reference to FIGS. 3 and 4. As in the first embodiment, the members formed on the first substrate 11 are indicated by a solid line, and the members formed on the second substrate 15 are indicated by a dashed line.

A first substrate 11 and a first contact portion 12 formed on the first substrate 11 are of the same material, configuration and construction as those of the first embodiment. However, the first conductor layer 12a and the first resistive element layer 12b are divided in two at a position near the center of the first contact portion 12. The distance between the two portions of the first conductor layer 12a obtained through division is approximately 1 to 2 mm, which is much larger than the thickness of the first contact portion 12. However, it is sufficiently smaller than the diameter of the first contact portion 12. Further, the two portions of the first resistive element layer 12b obtained through division cover the entire surface of the first conductor layer 12a.

On the same surface of the first substrate 11 on which the first contact portion 12 is formed, there are formed a first wiring pattern 13 and a second wiring pattern 17 consisting of the same material as the first conductor layer 12a, and the two portions of the first conductor layer 12a obtained through division are respectively formed integrally with the first or second wiring pattern 13, 17.

On the second substrate 15, there is only formed a second contact portion 16 which of the same material, configuration and construction as those of the first embodiment, and a second conductor layer 16a and a second resistive element layer 16b are stacked together to form a second contact portion 16. As in the first embodiment, the adhesive member 14 consists of a base member 14b and adhesive layers 14c on both sides thereof, an opening (hereinafter referred to as a through-hole 14a) being provided. As in the first embodiment, the first and second substrates 11 and 15 are glued together by the adhesive member 14, and the first and second contact portions 12 and 16 are arranged in the same state as in the first embodiment.

The first and second wiring patterns 13 and 17 are electrically connected through the first and second contact portions 12 and 16, and connected to the exterior to effect power supply to the first and second contact portions 12 and 16 and output of the resistance value between the first and second contact portions 12 and 16.

Next, a method of producing the first and second embodiments and, in particular, the contact portions 2, 6, 12 and 16 will be described.

The preparation of the conductor layers 2a, 6a, 12a and 16a is conducted simultaneously with the preparation of the wiring patterns 13 and 17. After the pattern formation of a conductive ink in which a conductive filler is dispersed in an organic solvent containing a binder resin on the substrates 1, 5, 11 and 15 by screen printing, the conductive ink is dried to vaporize the organic solvent.

In preparing the resistive element layers 2b, 6b, 12b and 16b, printing is effected by screen printing on the conductive layers 2a, 6a, 12a and 16a in a resistive ink in which metal oxide particles or carbon particles are dispersed in an organic solvent containing a binder resin consisting of a thermosetting resin, and then the resistive ink is dried to vaporize the organic solvent. In this way, the production of the contact portions 2, 6, 12 and 16 is completed.

Next, the power supply to the contact portions 2 and 6 and the resistance value output between the contact portions 2 and 6 in the first embodiment will be described.

The electric current applied from the first wiring pattern 3 to the first contact portion 2 flows through the first conductor layer 2a, and passes through the electrical contact surfaces of the first and second resistive element layers 2b and 6b before it reaches from the second conductor layer 2a to the second wiring pattern 7.

At this time, the current path is substantially perpendicular to the opposing surfaces of the first and second resistive elements 2b and 6b, and takes the shortest route in the first and second resistive elements 2b and 6b, so that the resistance value output due to the contact resistance is predominant. Further, the current path is distributed over the entire area in the opposing surfaces of the first and second resistive elements, so that, in the resistance value output, the variation in the electrical characteristics in the planes of the first and second resistive element layers 2b and 6b.

Subsequently, the power supply to the contact portions 12 and 16 and the resistance value output between the contact portions 12 and 16 in the second embodiment will be described.

The electric current applied from the first wiring pattern 13 to the first contact portion 12 flows through one of the portions of the first conductor layer 12a obtained through division, and passes through the electrical contact surfaces of the first and second resistive element layers 12b and 16b before it reaches the second conductor layer 16a. After flowing through the second conductor layer 16a, it passes again through the electrical contact surfaces of the first and second resistive element layers 12b and 16b before it reaches the second wiring pattern 17 from the other portion of the first conductor layer 12a.

In addition to the characteristics of the first embodiment, the resistance value output characteristics of the second embodiment is such that the electric current passes through the electrical contact surfaces of the first and second resistive element layers 12b and 16b twice, so that, when the electrical contact state of the first and second resistive element layers 12b and 16b varies, the variation in the resistance value out is double that of the first embodiment.

While in the above-described first and second embodiments the material of the conductor layers 2a, 6a, 12a and 16a is one obtained by dispersing silver particles as a conductive filler in a binder resin such as polyester or urethane, it is possible for the conductive filler to be a mixture of carbon and silver or carbon. There is no restriction as to the material and production method of the conductor layers 2a, 6a, 12a and 16a as long as the specific resistance of the material is negligible as compared with that of the material of the resistive element layers 2b, 6b, 12b and 16b.

Further, while in the first and second embodiments the material of the resistive element layers 2b, 6b, 12b and 16b is one obtained by dispersing a metal oxide or a carbon material in a thermosetting resin as a binder resin such as phenol, there is no restriction regarding the material and production method of the resistive element layers 2b, 6b, 12b and 16b as long as the specific resistance of the material is $10^2$ to $10^6$ (Ω·cm), and more preferably, $10^3$ to $10^5$ (Ω·cm).

In the first and second embodiments the conductor layers 2a, 6a, 12a and 16a are covered with resistive element layers 2b, 6b, 12b and 16b prepared without involving pin holes. This is for the purpose of preventing migration of the silver contained in the conductor layers 2a, 6a, 12a and 16a. When the conductor layers 2a, 6a, 12a and 16a are formed of a material little subject to migration, it is also possible to adopt a structure in which the conductor layers 2a, 6a, 12a and 16a are larger than the resistive element layers 2b, 6b, 12b and 16b and exposed from the resistive element layers 2b, 6b, 12b and 16b. In this case, however, it is necessary to prevent the conductor layers from coming into contact with each other through pressurization by, for example, covering the exposed conductor layers with the adhesive member. The construction of the electronic pressure-sensitive device is not restricted to the above constructions. Any construction will do as long as the first resistive element layers 2b and 12b and the second resistive element layers 6b and 16b are constantly in an electrical contact state.

Further, while in the above embodiments the resistive elements and the conductors are formed as resistive element layers 2b, 6b, 12b and 16b and conductor elements 2a, 6a, 12a and 16a, their configuration is not restricted to the layer form.

(Comparative Example)

Figure 5:
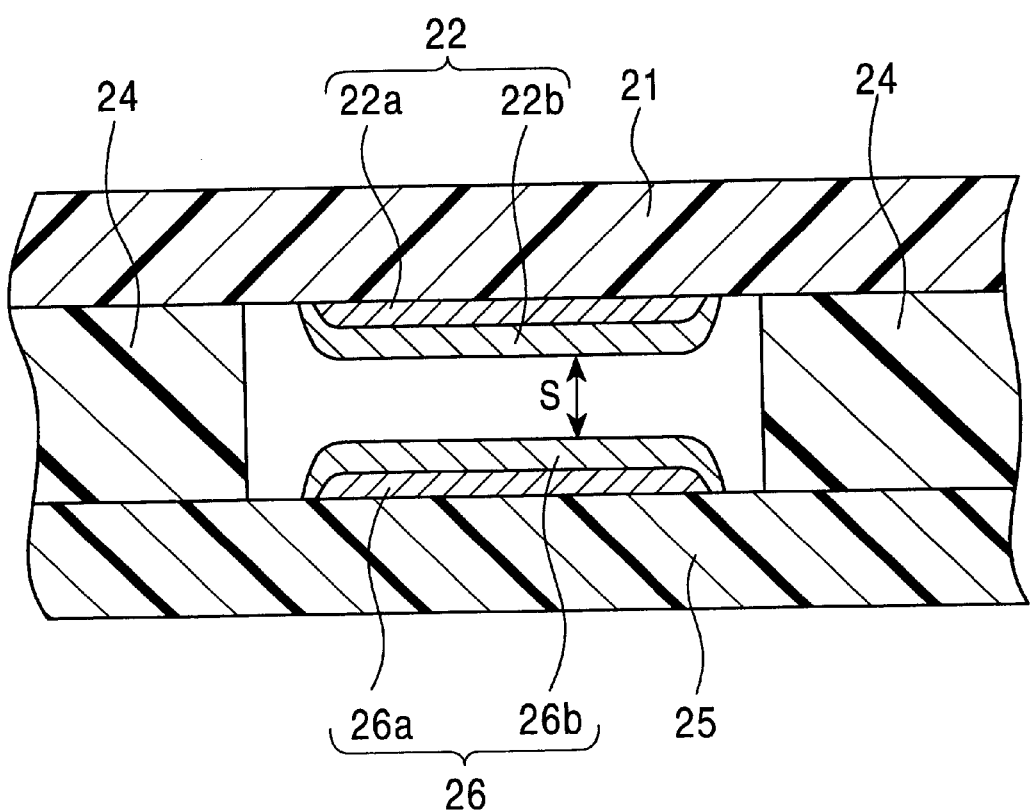
FIG. 5 is a sectional view of an electronic pressure-sensitive device used as a comparative example.

FIG. 5 is a sectional view of an electronic pressure-sensitive device as a comparative example.

Like the embodiments of the present invention, the comparative example comprises first and second substrates 21 and 25, and first and second contact portions 22 and 26 formed on the first and second substrates 21 and 25 and opposed to each other. The first and second contact portions 22 and 26 are of a double layer structure, consisting of first and second conductor layers 22a and 26a and first and second resistive element layers 22b and 26b. The first resistive element layer 22b and the second resistive element layer 26b are opposed to each other through the intermediation of a gap S as long as no load is applied to the substrates 21 and 25, the width of the gap S being maintained by the thickness dimension of a spacer 24 provided between the first and second substrates 21 and 25.

Next, the load-resistance characteristics of the electronic pressure sensitive device of the present invention will be described. The load-resistance characteristics of the first and second embodiments are qualitatively the same. In the following, to simplify the illustration, only the reference numerals of the first embodiment will be used.

Figure 6:
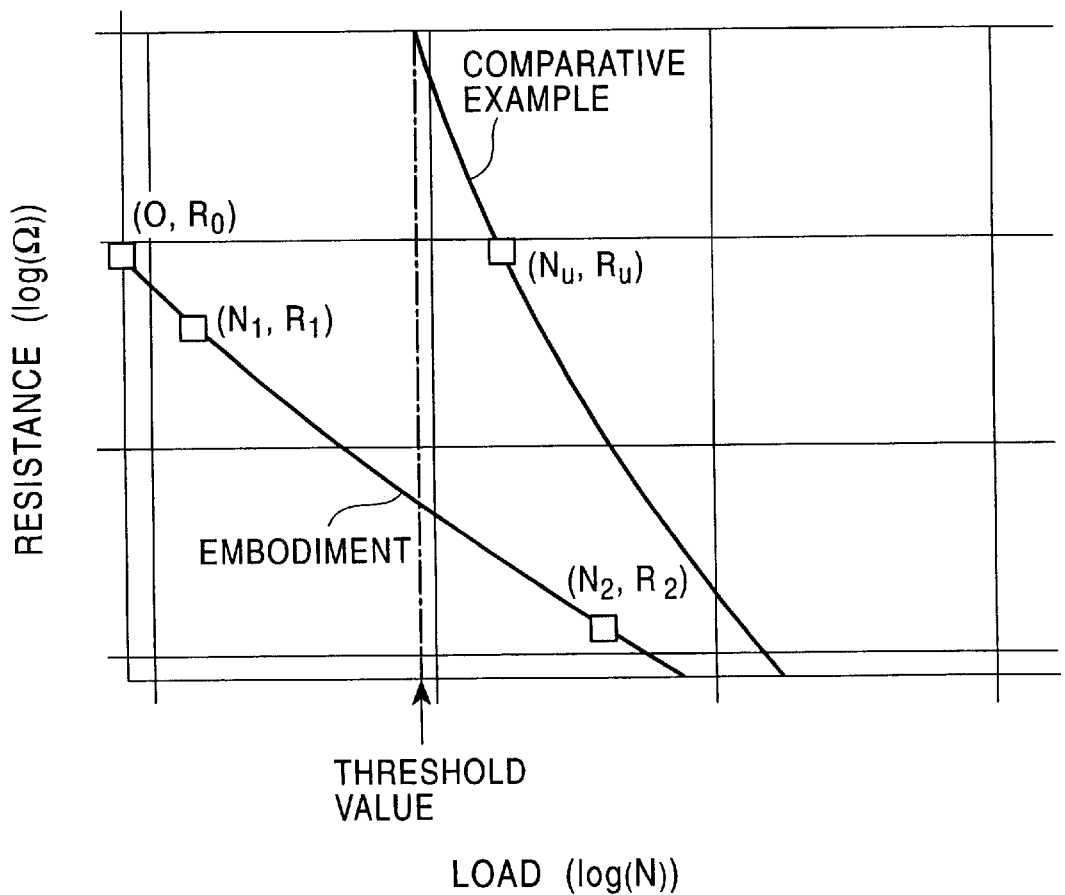
FIG. 6 is a graph showing the load/resistance-value characteristics of the electronic pressure-sensitive device of the present invention.
Figure 7:
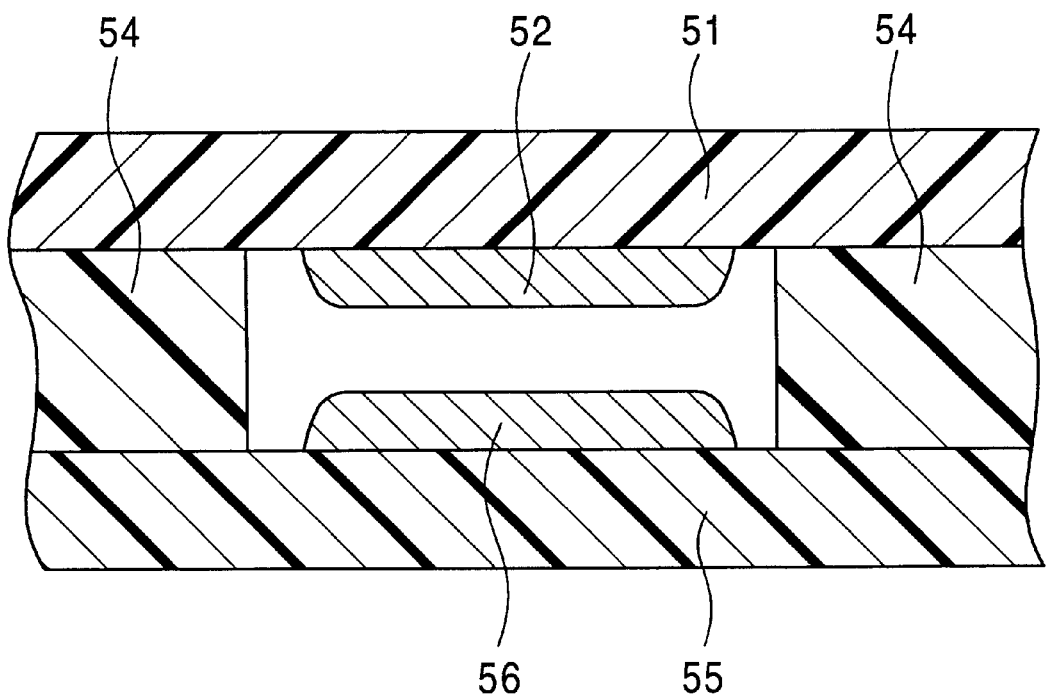
FIG. 7 is a sectional view of a conventional electronic pressure-sensitive device.

FIG. 6 is a log-log graph qualitatively showing the load-resistance characteristics of the present invention and the comparative example. In the log-log graph, the number of digits is varied by one for one increment of the scales of the vertical axis and the horizontal axis.

First, the load-resistance characteristics of the comparative example shown in the graph of FIG. 6 will be described.

In the comparative example, when there is no load applied to the substrates 21 and 25, the first and second resistive element layers 22b and 26b are opposed to each other through the intermediation of the gap S, as shown in FIG. 5, so that the resistance between the first and second contact portions 22 and 26 is infinite.

In the comparative example, even if a load is applied to the first and second substrates 21 and 25, the first and second resistive element layers 22b and 26b are not brought into contact with each other as long as the load is minute, and the resistance remains infinite. When a load $N_u$ exceeding a threshold value is applied to the first and second substrates 21 and 26, the first and second resistive element layers 22b and 26b are brought into contact with each other, and a resistance value $R_u$ corresponding to the load $N_u$ is output.

In this electronic pressure-sensitive device, it is impossible to detect a load up to the threshold value, so that it is not suitable for the detection of small loads including those near zero.

Next, the load-resistance characteristics of the present invention shown in the graph of FIG. 6 will be described.

Figure 4:
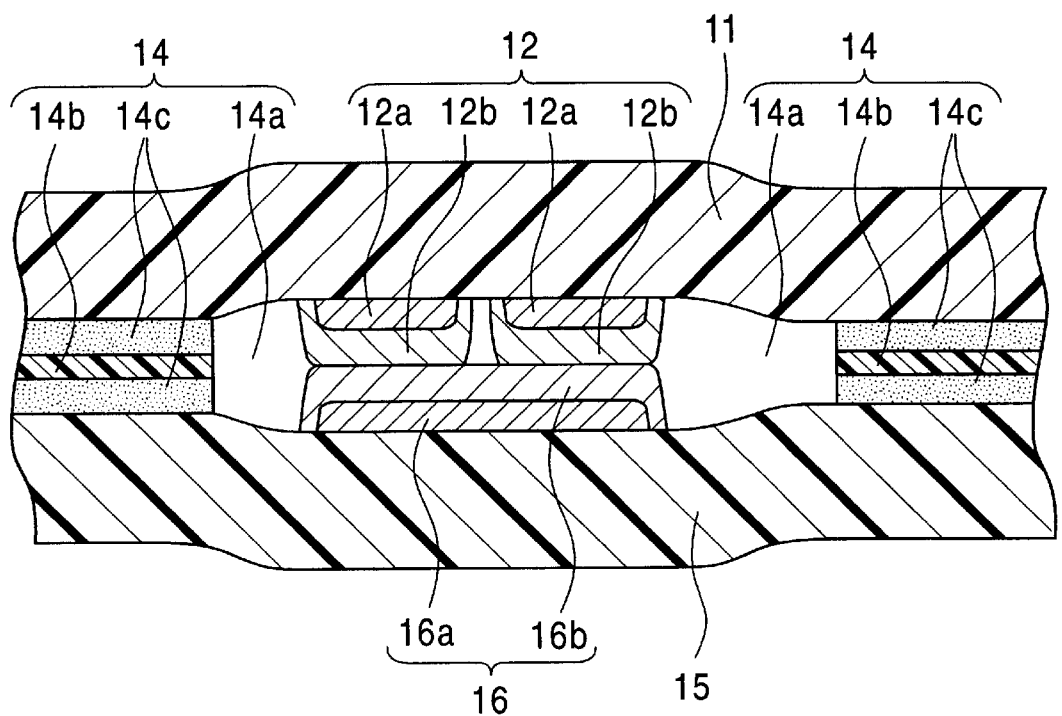
FIG. 4 is a sectional view taken along the line IV—IV of FIG. 3.

As shown in FIGS. 2 and 4, in the electronic pressure-sensitive device of the present invention, the first and second resistive element layers 2b and 6b are constantly in an electrical contact state, so that even when no load is applied to the substrates 1 and 5, the resistance value measured between the first and second contact portions 2 and 6 is a limited value $R_0$.

And, when a load $N_1$ is applied to the first and second substrates 1 and 5, even if it is a minute load, the force pressurizing the first and second resistive element layers 2b and 6b increases in accordance with the magnitude of the load $N_1$, and, as a result, the contact area of the first and second resistive element layers 2b and 6b increases to reduce to the contact resistance, so that the output resistance value decreases from $R_0$ and becomes a value $R_1$ corresponding to the load $N_1$.

Further, the resistance value $R_1$ corresponding to the load $N_1$ increases in proportion to the specific resistance of the material of the resistive element layers 2b and 6b, so that by appropriately selecting the material of the resistive element layers 2b and 6b, the resistance value $R_1$ can be made a value suited for measurement. Thus, it is possible to accurately detect the load $N_1$.

Further, as shown in FIGS. 2 and 4, in the electronic pressure-sensitive device of the present invention, the first and second substrates 1 and 5 are deflected between the adhesive member 4 and the contact portions 2 and 6, and, due to this deflection, even if no external force is applied, the first and second substrates 1 and 5 pressurize the first and second contact portions 2 and 6, whereby a press contact force (pressurization) is applied to the first and second resistive element layers 2b and 6b. The press contact force applied to the first and second resistive element layers 2b and 6b by the first and second substrates 1 and 5 is larger when the adhesive member 4 is thin than when it is thick, so that, if the magnitude of the load applied to the substrates is the same, the resistance between the first and second contact portions 2 and 6 is lower when the adhesive member 4 is thin.

However, when the load applied to the substrates is sufficiently large, and the force generated due to the deflection of the substrates (pressurization) is negligible, the resistance between the first and second contact portions 2 and 6 converges on a value which does not depend upon the thickness of the adhesive portion. Thus, the variation in the resistance with respect to the variation in the load is milder when the adhesive member 4 is thin.

In an electronic pressure-sensitive device detecting from load $N_1$ (minimum value) to $N_2$ (maximum value), the material of the resistive element layers 2b and 6b is selected such that the resistance value $R_1$ corresponding to the load $N_1$ is an appropriate value. At this time, when the load $N_2$ is large and the width from the load $N_1$ to $N_2$ is large, the variation in the resistance with respect to the variation in the load is made milder by using a thin adhesive member 4, whereby it is possible to include the resistance value $R_1$ corresponding to the load $N_1$ to the resistance value $R_2$ corresponding to the load $N_2$ in a resistance value range suitable for measurement.

Further, by varying the thickness of the adhesive member 4, with both the resistance values $R_1$ and $R_2$ being included in a range suitable for measurement, it is possible to adjust the variation amount of the resistance value with respect to the variation in the load.

The electronic pressure-sensitive device of the present invention can be used, for example, in an in-car seat sensor or a zoom switch in a camera.

When the electronic pressure-sensitive device of the present invention is used in an in-car seat sensor, a plurality of pressure-sensitive devices are embedded in the seat cushion, and arranged in the plane of the seat base (the seat base receiving the weight of a person) to detect the magnitude of the load applied to each position in the seat base plane. It is possible to specify the physique of the sitting person from the in-plane distribution of the magnitude of the load, so that it is possible to adjust the operation of the air bag at the time of collision according to the physique of the person sitting on the seat to prevent the person sitting on the seat from being injured by the spouting shock of the air bag.

Further, in the case of an in-car seat sensor, a load can be continuously applied thereto at high temperature by a baggage or the like. In the electronic pressure-sensitive device of the present invention, there is no gap between the contact portions 2 and 6, so that the substrates 1 and 2 do not sink in a gap at high temperature to be greatly deflected and deformed. Thus, it is not necessary to use an expensive heat resistant material such as polyethylene naphthalate, which has conventionally been used as a substrate material, and it is possible to use an inexpensive substrate material such as polyethylene terephthalate. Thus, there is little burden on the substrates 1 and 5, and the service life of the device can be increased.

Further, in the electronic pressure sensitive device of the present invention, both the first and second substrates 1 and 5 are flexible, so that, if it is embedded in a cushion, the person sitting on the seat experiences no uncomfortable feeling.

In the above embodiments both the first and second substrates 1 and 5 are flexible. However, when the electronic pressure-sensitive device of the present invention is used in a zoom switch in a camera, one of the first and second substrates 1 and 5 is placed on a base, so that the base-side substrate of the first and second substrates 1 and 5 may be a rigid substrate.

Further, while in the above embodiments the through-holes 4a and 14a are substantially circular so as to obtain a stable resistance value output with little variation, the configuration of the through-holes is not restricted to a circular one. It may also be of a polygonal configuration, such as a hexagon. Further, it is not absolutely necessary for the through-holes 4a and 14a to be completely closed. It is possible for them, for example, to exhibit a C-shaped structure substantially surrounding the contact portions (the resistive element layers) (There is provided a fine cutout extending from the through-hole 4a, 14a to the end portion of the adhesive member 4, 14).

In the electronic pressure-sensitive device of the present invention, the first and second contact portions have on the outermost surfaces thereof first and second resistive elements consisting of a high-resistance material, and, in a condition in which the first and second resistive elements are constantly maintained in an electrical contact state, the press contact force acting on the first and second resistive elements is detected as the electrical resistance between the first and second contact portions.

In this electronic pressure-sensitive device, the first and second resistive element layers consisting of a high-resistance material are constantly in an electrical contact state, so that, even when no load is applied to the substrates, the resistance value measured between the first and second contact portions is a finite value. When a load is applied to at least one of the first and second substrates, even if it is minute load, the press contact force acting on the first and second resistive elements increases according to the load, and the electrical contact area of the first and second resistive elements increases to thereby reduce the contact resistance, so that the resistance value measured between the first and second contact portions is a value according to the load. Thus, it is possible to detect loads of various magnitudes including those in proximity to zero.

What is claimed is:

1. An electronic pressure-sensitive device comprising:

a first substrate consisting of an insulating material, a first contact portion formed on the first substrate, a first resistive element consisting of a material whose specific resistance ranges from $10^2$ to $10^6$ ($\Omega \cdot cm$), constituting the first contact portion and provided on the outermost surface of the first contact portion, a second substrate consisting of an insulating material and opposed to the first substrate, a second contact portion formed on the second substrate and opposed to the first contact portion, a second resistive element consisting of a material whose specific resistance ranges from $10^2$ to $10^6$ ($\Omega \cdot cm$), constituting the second contact portion and provided on the outermost surface of the second contact portion, and an adhesive member provided between the first and second substrates and gluing the first and second substrates to each other, wherein the adhesive member is formed at a position spaced apart from the first and second resistive elements so as to surround the first and second resistive elements, wherein the first contact portion and the second contact portion has a summed thickness that is larger than a thickness of the adhesive member, wherein at least one of the first and second substrates is flexible, wherein the first and second resistive elements are formed by screen printing, wherein the first and second resistive elements are constantly maintained in an electrical contact state, and an electrical resistance value measured between the first contact portion and the second contact portion is applied as a limited value, and wherein a press contact force acting between the first and second resistive elements by pressurizing the first and second contact portions from at least one side is detected as the electrical resistance between the first and second contact portions.

2. An electronic pressure-sensitive device according to claim 1, wherein the adhesive member consists of an insulating sheet-like member, and wherein the distance between the first and second substrates is larger where the first and second contact portions are formed than where the adhesive member is provided.

3. An electronic pressure-sensitive device according to claim 2, wherein the adhesive member consisting of a sheet-like member is provided with an opening, and the first and second resistive elements are electrically contacted to each other inside the opening.

4. An electronic pressure-sensitive device according to claim 2, wherein the adhesive member consists of a sheet-like base member on either side of which an adhesive layer is formed.

5. An electronic pressure-sensitive device according to claim 1, wherein both the first and second substrates are flexible.

6. An electronic pressure-sensitive device according to claim 1, wherein at least one of the first and second contact portions has a conductor electrically connected to the first and second resistive elements.

7. An electronic pressure-sensitive device according to claim 6, wherein the first and second contact portions respectively have first and second conductors, the first and second conductors being opposed to each other through the intermediation of the first and second resistive elements and formed in the area where the first and second resistive elements are opposed to each other.

8. An electronic pressure-sensitive device according to claim 6, wherein the first and second resistive elements are formed on the surfaces of the first and second conductors, and wherein the surface area of the resistive elements differs from the surface area of the conductors.

9. An electronic pressure-sensitive device according to claim 8, wherein the resistive elements cover the entire surfaces of the conductors.

10. An electronic pressure-sensitive device according to claim 1, wherein the first and second resistive elements are formed of the same material.

11. An electronic pressure-sensitive device according to claim 1, wherein a wiring pattern consisting of a conductive material is formed on at least one of the first and second substrates, the wiring pattern being electrically connected to the first and second contact portions.

* * * * *